Oct. 9, 1923.
A. G. YENT
1,470,418
HYDROCARBON BURNER
Filed May 27, 1920
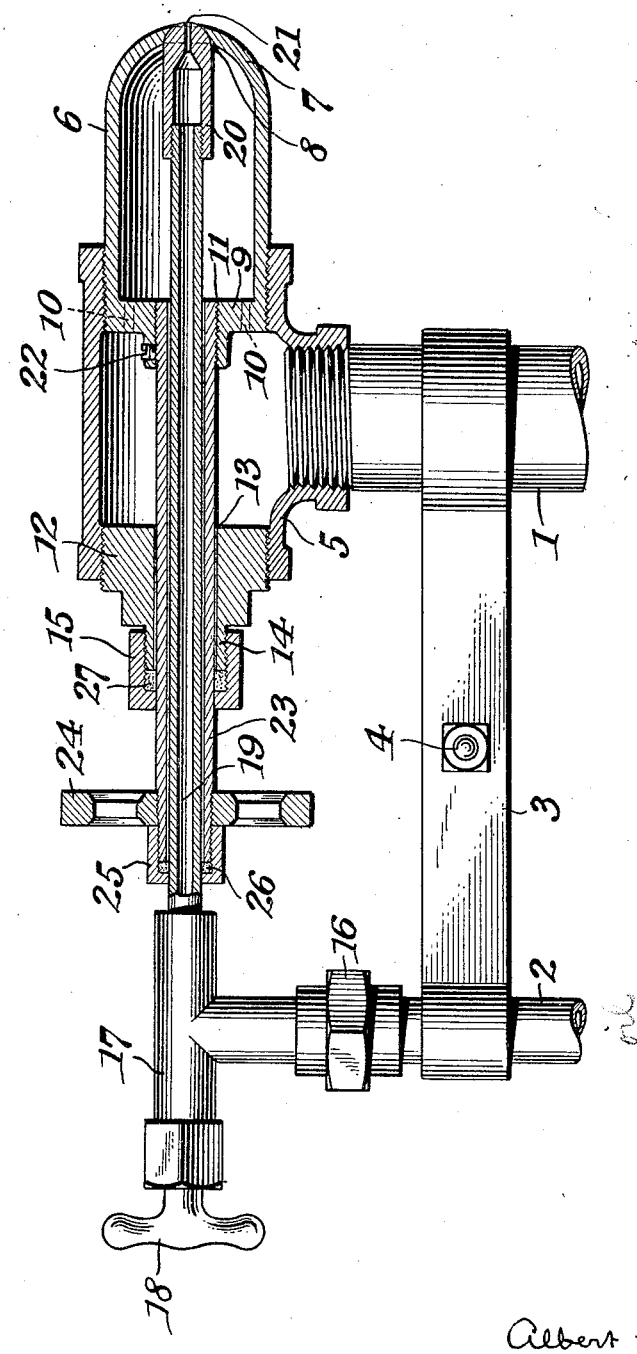
INVENTOR
Albert G. Yent
BY F. H. Gibbs
ATTORNEY

UNITED STATES PATENT OFFICE.

ALBERT G. YENT, OF JEFFERSONVILLE, INDIANA, ASSIGNOR TO AMERICAN CAR AND FOUNDRY COMPANY, OF NEW YORK, N. Y., A CORPORATION OF NEW JERSEY.

HYDROCARBON BURNER.

Application filed May 27, 1920. Serial No. 384,657.

*To all whom it may concern:*

Be it known that I, ALBERT G. YENT, residing at Jeffersonville, Clark County, Indiana, and being a citizen of the United States, have invented certain new and useful Improvements in a Hydrocarbon Burner, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claim will occur to persons skilled in the art.

In said drawings the figure is a view, partly in elevation and partly in section, showing my improved burner.

It is the object of my invention to provide an improved burner for liquid fuel wherein the relative amounts of air and oil used may be regulated quickly and accurately.

In the drawing, 1 designates the air inlet pipe, 2, the oil inlet pipe, the two pipes being held in relatively fixed positions by the clamp 3, the parts of which are held together by the bolt 4. To the end of the air inlet pipe 1 is attached the pipe T 5, to one arm of which is fitted an air nozzle 6 screw threaded into the T 5 and provided with a spherical end 7 that has an air outlet port 8. The other end of the air nozzle 6 is closed by the wall 9 provided with the ports 10 and a central screw threaded opening 11. The other arm of the T 5 is closed by a plug 12 having a central opening 13 and screw threaded into the T 5 and provided with a screw threaded projection 14 to receive the packing nut 15.

The oil inlet pipe 2 leads through a coupling 16 to a needle valve 17, of the usual construction, that is operated by the handle 18 and controls the admission of the liquid fuel to the supply pipe 19 that is fixed in the valve 17 and passes through the opening 13 in the plug 12 and the opening 11 in the wall 9 of the air nozzle 6 and is screw threaded into an oil nozzle 20 that is provided with an outlet opening 21 and adapted to engage the end 7 of the air nozzle 6 and close the air outlet port 8. Screw threaded into the wall 9 of the air nozzle 6 and held fixed with respect thereto by the set screw 22 is a tube 23 that surrounds the pipe 19 and extends through the opening 13 in the plug 12. The outer end of the tube 23 is provided with a hand wheel 24 screw threaded to the tube 23 and held fixed with respect to the tube by the packing nut 25 which also serves to compress the packing 26 and prevent the escape of air between the pipe 19 and tube 23. The packing nut 15 serves to compress the packing 27 so as to prevent the escape of air between the plug 12 and the tube 23.

In operation, the fuel supplied through pipe 2 passes through valve 17 and pipe 19 to the fuel nozzle 20 and escapes through the outlet port 21. The air supplied through pipe 1 passes to the chamber in the T 5 and through the ports 10 into the air nozzle 6. The escape of the air from the nozzle 6 is controlled by operating the hand wheel 24, which, through tube 23, serves to rotate the air nozzle 6 in the T 5, rotation in one direction causing the air nozzle 6 to be advanced from the T 5 and separating the spherical wall 7 from the end of the oil nozzle 20, opening the air outlet port 8 and rotation in the other direction causing the air nozzle 6 to be drawn into the T 5 and the wall 7 to engage the end of the oil nozzle 20 closing the air outlet port 8.

What I claim is:

In a liquid fuel burner, a T, an air nozzle fitted to one arm of said T and having an air outlet port, the inner end of said nozzle having a closing wall with ports and a threaded opening, a plug in the opposite arm of the T and having an opening, an air inlet pipe fitted to an arm of the T, an oil inlet pipe, a valve for controlling the flow of oil, an oil supply pipe communicating with said oil inlet pipe and passed through the openings in the closing wall of the air nozzle and plug, an oil nozzle on the end of said oil supply pipe and having an outlet opening, said oil nozzle fitted to close the air outlet of the air nozzle, a tube surrounding said oil supply pipe and having one end threaded in the opening of said closing wall, and means on said tube exteriorly of the T for rotating the air nozzle relative to the oil nozzle.

In witness whereof I have hereunto set my hand in the presence of two witnesses.

ALBERT G. YENT.

Witnesses:
ALLEN W. CLARKE,
CLIFTON C. EASTMAN.